United States Patent Office 3,386,969
Patented June 4, 1968

3,386,969
FUSIBLE POLYBENZIMIDAZOLES
Harold H. Levine, La Jolla, Calif., assignor to Whittaker Corporation, Los Angeles, Calif., a corporation of California
Continuation of application Ser. No. 238,697, Nov. 19, 1962. This application June 27, 1966, Ser. No. 561,645
11 Claims. (Cl. 260—78.4)

ABSTRACT OF THE DISCLOSURE

This patent describes novel substantially fusible polybenzimidazole polymers having an inherent viscosity in the range of about 0.03 to 0.10 as measured in a 0.5% solution of dimethyl sulfoxide and having a fusion temperature less than about 400° C. These novel fusible polymers are prepared by heat polymerizing an ester of an aromatic dicarboxylic acid with an aromatic tetramine to a point short of that at which substantial infusibility occurs.

---

Figure 1:
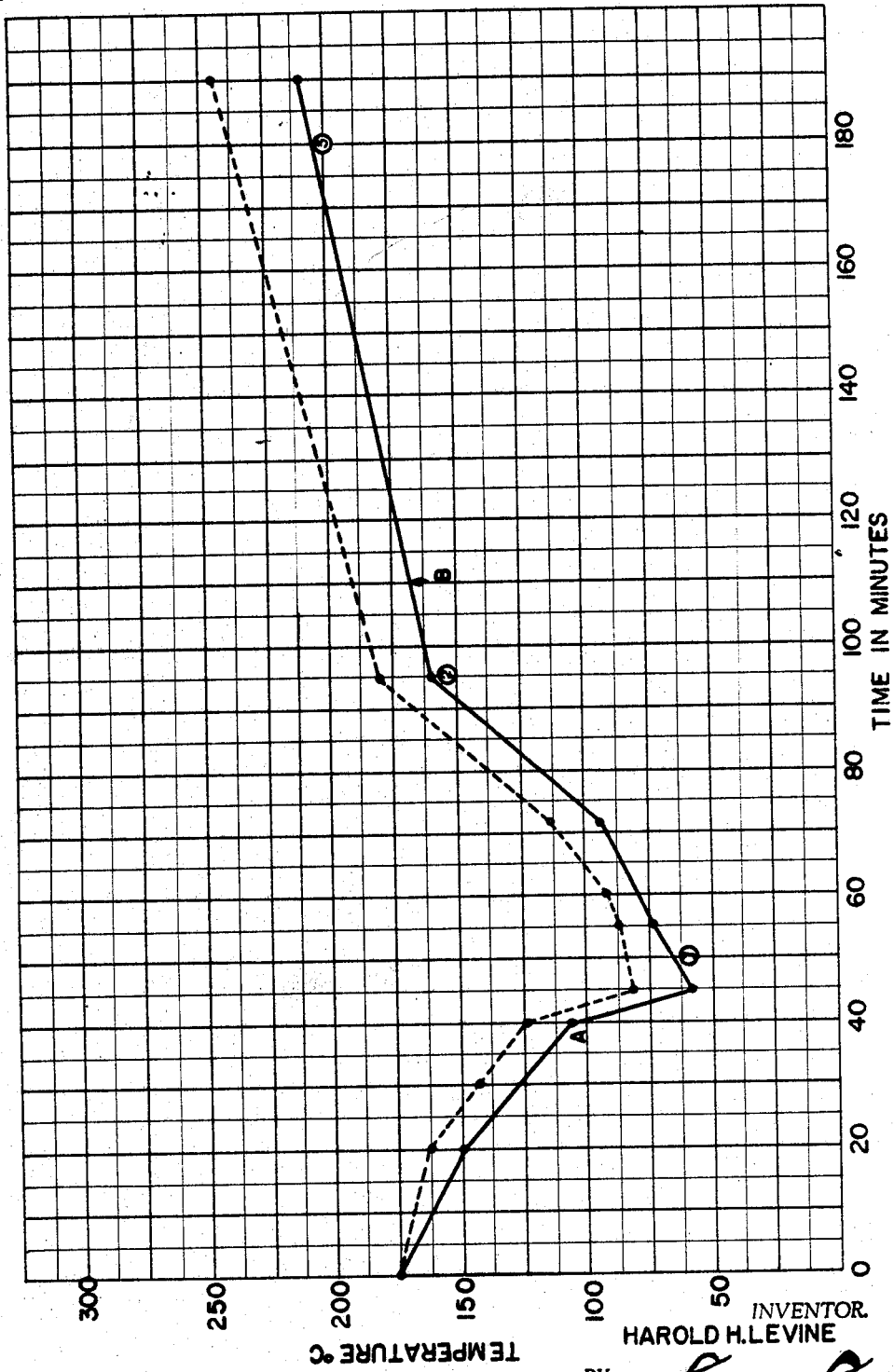

This application is a continuation of application Ser. No. 238,697, filed Nov. 19, 1962, now abandoned.

The present invention relates to a novel laminating composition and the process of producing this composition. In addition, the present invention relates to the use of this composition as an adhesive and in laminating processes and the product produced thereby. More particularly, the present invention relates to novel fusible condensation polymers and still more particularly to novel fusible polybenzimidazoles.

There are, of course, a wide variety of known condensation polymers such as polyamides and polyesters which have found extensive use in the plastic industry, particularly in the form of fibers, films, and molded articles. In addition, a relatively recent development, e.g., Marvel and Vogel, J. Poly. Sc., vol. L, page 511 (1961) and Patent No. 2,895,948, has been the production of polybenzimidazoles which are extremely resistant to high temperatures, i.e., substantially infusible, and which are nonadhesive. While these known polybenzimidazoles are useful in the preparation of molded objects and the like which are resistant to high temperatures, their substantial infusibility renders them incapable of use in conventional plastic forming, coating, and laminating equipment and processes.

It is an object of this invention to provide a novel and valuable polymeric material and the process of making this material.

Another object of the present invention is to provide a novel type of linear condensation polymer characterized by its fusibility and the process of making this polymer.

It is further an object of the present invention to provide a fusible polybenzimidazole and the process of making this material.

It is still another object of the present invention to provide a fusible polybenzimidazole which has been prepared by the use of a diphenyl ester of an aromatic dicarboxylic acid and the process of making this polymer.

Another object of the present invention is to provide laminating and impregnating processes which employ the composition described in the foregoing objects and the product produced by these processes.

A further object of the present invention is to provide an adhesive comprising a fusible polybenzimidazole.

Other objects and advantages, it is believed, will be apparent from the following description of the present invention.

Briefly, the present invention comprises the condensation of an aromatic tetramine and a diphenyl ester of an aromatic dicarboxylic acid to a degree short of substantial infusibility to produce a fusible polybenzimidazole. The aromatic tetramines used in the practice of the present invention are bis-(ortho-diamino) aromatic compounds, e.g., 3,3'-diaminobenzidine. The diphenyl esters of aromatic dicarboxylic acids which may be used in the present invention preferably have the diphenyl esters either meta or para to each other because an ortho diester may lead to imide formation and hence interfere with the condensation reaction. A wide variety of diphenyl esters may be used in the present invention, e.g., the diphenyl esters of isophthalic, terephthalic and diphenic acids; diphenyl 3,5-pyridine dicarboxylate; diphenyl 3,5-furane dicarboxylate and diphenyl naphthalene-1,6-dicarboxylate and diphenyl pyrene-3,8-dicarboxylate. Thus, it will be apparent to those skilled in the art that single ring, multi-ring fused ring, and heterocyclic aromatic diphenyl esters may be used in the practice of the present invention.

The polymer of the present invention is polymerized to a degree which is insufficient to render it substantially infusible. In general, but not by way of limitation, the polymerization is performed such that the polymer is fusible at temperatures up to about 500° F. The degree of polymerization will, of course, depend upon the ultimate use to which the polymer is to be put. In any event, the present invention provides a process for the production of a polybenzimidazole which has desired fusibility properties and which requires only routine experimentation to determine the degree of polymerization necessary for a given use. The process of using this polymer to laminate or impregnate other articles is within the scope of the present invention. The fusibility of the polymers of the present invention renders them capable of wetting the surfaces to which they are to be bonded. This wetting is essential for adhesion to many substrates and is not found in prior art polybenzimidazoles.

The invention is further illustrated by the following examples.

*Example No. 1.—Prepolymer from diphenylterephthalate and 3,3'-diaminobenzidine by melt condensation*

6.42 g. (0.03 mole) of 3,3'-diaminobenzidine and 9.54 g. (0.03 mole) of diphenyl terephthalate were mixed in a 65 ml. round-bottom flask and the system then purged with nitrogen. The flask was immersed in a silicone oil bath at 262° C. and heated for 8½ min. at 256–60° C. The product was cooled to room temperature under vacuum and formed a solid yellow cake.

There were obtained 13.70 g. of prepolymer which fused at 160–70° C. and melted at 320° C. The inherent viscosity ($\eta_{inh}$) of a 0.5% solution in dimethyl sulfoxide was 0.051, corresponding to a degree of reaction of 33.6%.

*Example No. 2.—Prepolymer from diphenyl isophthalate and 3,3'-diaminobenzidine by solution polymerization*

30,000 parts of freshly distilled carbon dioxide and oxygen free N-methylpyrollidone was added to 636 parts of diphenyl isophthalate and 428 parts of 3,3'-diaminobenzidine. This was refluxed for 16 hours at 202° C. and cooled to room temperature. The soluble polymer was isolated by drowning in 300,000 parts of freshly boiled, oxygen and carbon dioxide free water. After isolation and drying, the polymer had a $\eta_{inh}$ of 0.059. When used to bond 17–7 pH stainless steel, the tensile shear strengths at room temperature and at 700° F. after an hour at 700° F. were 2,670 p.s.i. and 1,655 p.s.i. respectively.

*Example No. 3.—Pre-copolymer from diphenyl isophthalate, diphenylterephthalate and 3,3'-diaminobenzidine by melt condensation*

A mixture of 4.28 parts of 3,3'-diaminobenzidine, 3.18 parts of diphenylterephthalate, and 3.18 parts of diphenyl isophthalate was prepared in a 65 ml. round-bottom flask and then purged with nitrogen. The flask was immersed in an oil bath at 264° C. and heated for 10½ min. at 256–60° C. The flask was then removed from the bath and cooled under vacuum.

A total of 8.36 g. of pre-copolymer was obtained, which fused at 200° C. and melted at 270–80° C. The inherent viscosity of a 0.5% solution in dimethyl sulfoxide was 0.067.

When used to bond 17-7 pH stainless steel, the tensile shear strengths at room tempertaure and at 700° F. after an hour at 700° F. were 3,280 p.s.i. and 2,080 p.s.i. respectively.

*Example No. 4.—Prepolymer from diphenyl isophthalate and 3,3'-diaminobenzidine by melt condensation*

Stoichiometric ratios of diphenyl isophthalate and 3,3'-diaminobenzidine were mixed thoroughly in a nitrogen purged flask and placed in a 200° C. bath while maintaining a very slight positive nitrogen pressure. Samples were withdrawn periodically and used to determine fusion temperature, melting point and inherent viscosity. The data are illustrated in FIGURES 1 and 2.

FIGURE 1 shows that a rapid significant drop takes place in the melting point and fusion temperature of the mixture and reaches a minimum of 57.5° C. after 45 minutes. Point A represents the time at which the sample of the mixture forms a clear solid when cooled to room temperature. Prior to this time, it is believed that the cooled, turbid solid contained some undissolved material. At A sufficient reaction resulted so that on cooling, there was an insufficient amount of the insoluble component to cause precipitation. Point B, after 110 minutes, is that time at which the prepolymer's fusion temperature exceeded the bath temperature of 200° C. Samples taken at (1), (2) and (3) showed that the reaction had proceeded to the extent of about 22%, 56% and 62% respectively.

Figure 2:
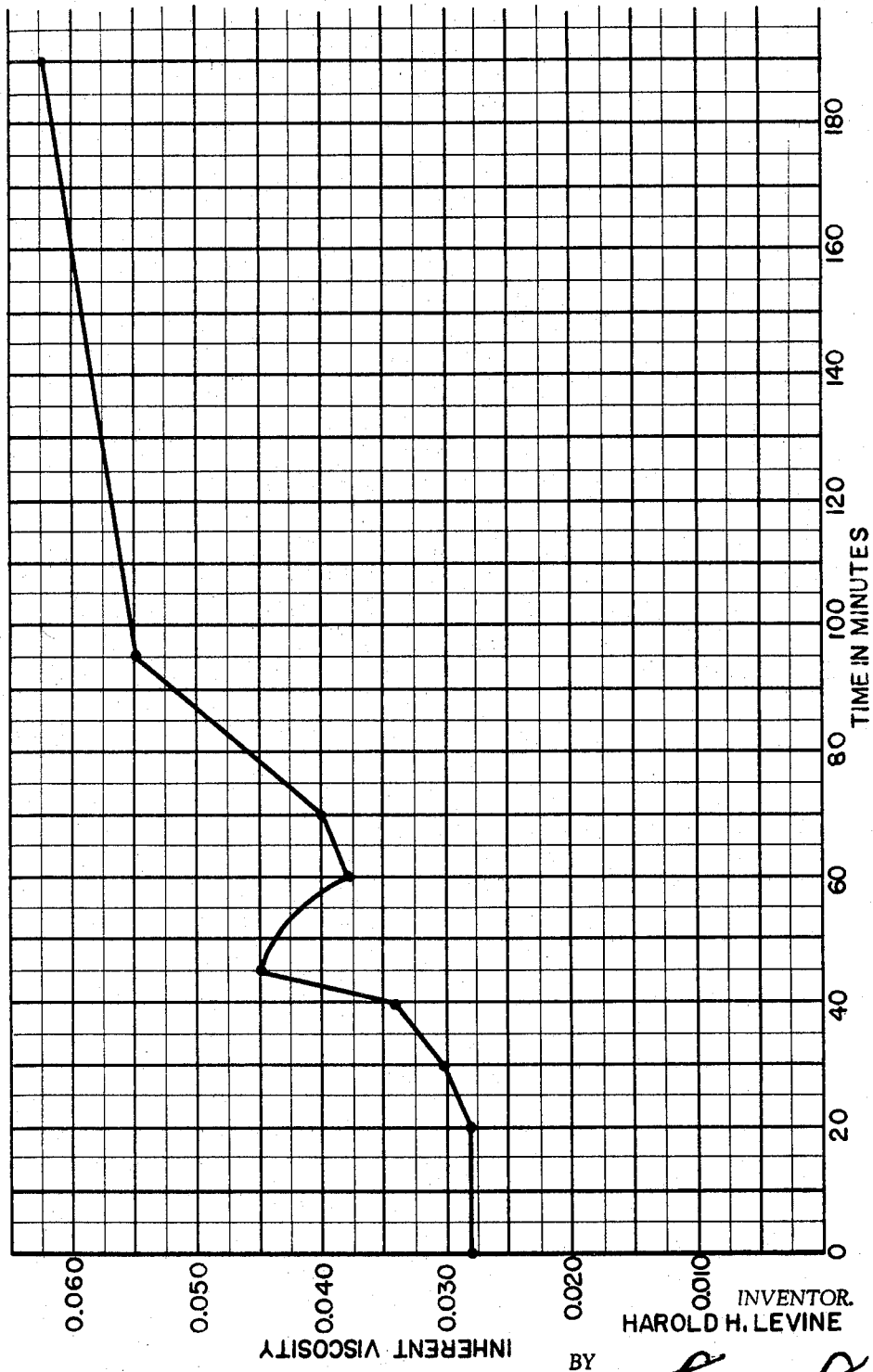

Based on the previously discussed requirements for a useful laminating resin or adhesive, it can be seen that under these reaction conditions the useful range lies between 50 minutes and 200 minutes at 200° C. and this corresponds to a melting point range of 125° C. to 275° C. and as seen in FIGURE 2 to a $\eta_{inh}$ of between 0.044 to 0.063. The relatively low melting point of the prepolymer could be used to hot melt coat glass fabric to prepare a laminating material. As such, this is highly desirable since solvent removal can be eliminated, and the resin pick-up by the fabric more precisely controlled while using only a single impregnation step. Further, the low fusion temperature permits the prepolymer to remain molten for longer periods of time since the reaction rate is significantly reduced.

The curve in FIGURE 2 is interesting because of what appears to be an anomolous portion of an otherwise normal reaction curve. Then $\eta_{inh}$ exhibited a sharp rise followed by a slower decrease between 40 and 60 minutes. This is interpreted to mean that the initial condensation predominantly favors the formation of poly(aminoamide) (I) and then continued reaction results in ring closure leading to the polybenzimidazole (II).

(II).

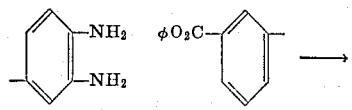

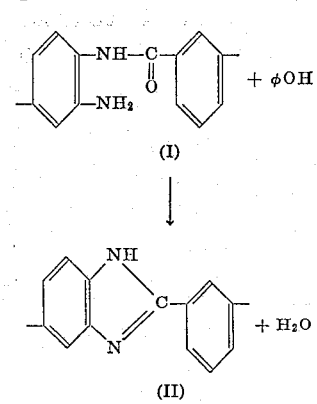

This seems reasonable since the poly(aminoamide) should co-ordinate more strongly with the highly polar solvent dimethylsulfoxide than the less polar polybenzimidazole. Such stronger coordination with the solvent can be expected to lead to increased viscosity data. However, the present invention is not to be considered to be limited to this explanation.

*Example No. 5.—Prepolymer from diphenylisophthalate and 3,3'-diaminobenzidine by melt condensation*

Figure 3:
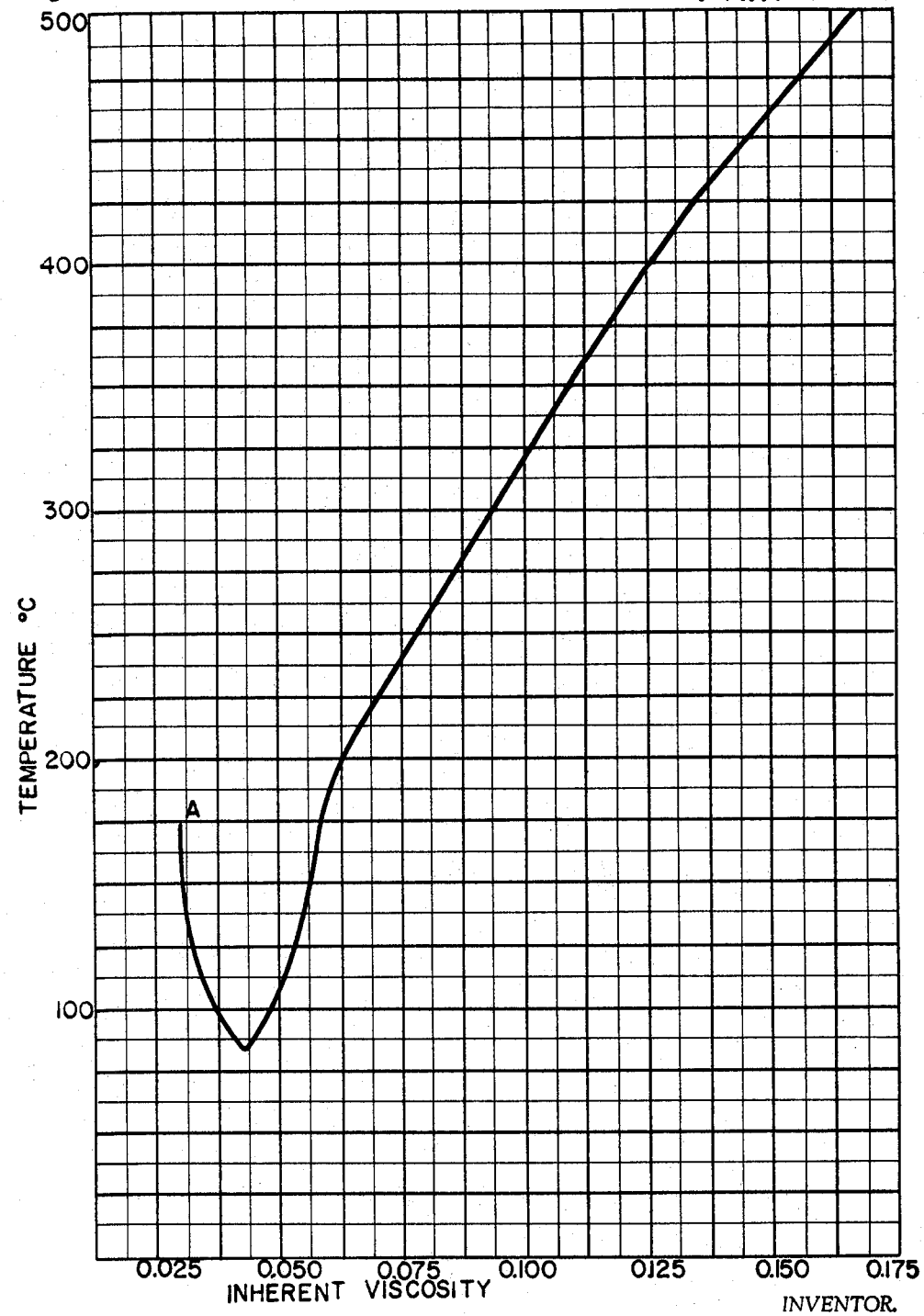

The reaction conditions used in Example No. 4 were repeated except that the reaction was permitted to go for a longer time. FIGURE 3, shows a plot of polymer melt temperature vs. $\eta_{inh}$. It can be seen that, from practical lamination and bonding considerations, that $\eta_{inh}$ falling outside the range of about 0.037–0.100 will give either a material that is essentially unreacted or one whose melting temperature is too high.

*Example No. 6.—Prepolymer from diphenylisophthalate and 3,3'-diaminobenzidine by melt condensation*

The procedure described in Example No. 4 was used except that the condensation was carried out isothermally at 175° C. It was found that prepolymer solidified after 5¾ hours. The reaction was terminated after 6 hours and the prepolymer was found to have a $\eta_{inh}$ of 0.059 with a degree of reaction of 43%.

*Example No. 7.—Prepolymer from diphenylisophthalate and 3,3'-diaminobenzidine by melt condensation*

The procedure described in Example No. 4 was used except that the condensation was carried out isothermally at 150° C. Sometime between 4 and 19 hours of heating, the mixture liquefied to a clear melt. This indicated that the condensation to a prepolymer can take place between the mixed solids. After 19½ hours, the prepolymer melt solidified and after 20 hours heating was terminated. At this point, the prepolymer had a $\eta_{inh}$ of 0.044 and a degree of reaction of 17%.

*Example No 8.—Laminate preparation using a diphenylisophthalate and 3,3'-diaminobenzidine prepolymer prepared by melt condensation using solvent impregnation*

A prepolymer was prepared by reaction at a bath temperature of 260° C.; this had a $\eta_{inh}$ of 0.068 and a degree of reaction of 64.5%.

The prepolymer was dissolved by warming and stirring with sufficient pyridine to give a 35% solution. This solution was brushed on heat cleaned glass fabric having a 181 weave and the wet fabric placed in a vacuum oven. The oven was slowly heated to 120° C. and evacuated to 30 inches of mercury during an hour and held for an hour at these conditions.

The dried impregnated swatches were stacked and cut to size and weighed to determine the resin pickup. These were then placed between two pieces of 0.002 inch thick aluminum foil, sandwiched between 0.064 inch thick aluminum caul plates, then placed in between two more pieces of foil and the entire assembly placed in a press preheated to 325° C. The pressure was immediately raised to 500 p.s.i. and the laminate cured for an hour at these conditions. After cooling to room temperature, the laminate was removed, cut into test specimens and post cured in vacuum for six hours at 400° C. The following data were obtained.

| Test Conditions | Flexural Strength, p.s.i. | Modulus, p.s.i.×10⁻⁶ |
|---|---|---|
| Room Temperature | 92,690 | 4.15 |
| 1 hour at 700° F | 74,060 | 4.01 |
| 1 hour at 500° F | 75,550 | 3.65 |
| 100 hours at 550° F | 80,150 | 3.43 |
| 250 hours at 550° F | 34,510 | 2.88 |

These test data clearly indicate the superiority of the polybenzimidazole resin of the present invention as a laminating resin over previously used organic resins.

*Example No. 9.—Bonding of 17–7 pH stainless steel using a diphenylisophthalate and 3,3'-diaminobenzidine prepolymer prepared by melt condensation*

A 35% solution of the prepolymer, used in Example No. 8, was prepared in pyridine. To this was added a weight of finely powdered aluminum equal to the weight of prepolymer and the slurry constantly stirred to maintain a homogeneous suspension.

The stainless steel test coupons were degreased with a suitable solvent, scoured with an abrasive detergent, rinsed and dried. The cleaned steel was then etched for two minutes at 185° F. in a bath consisting of 841 parts (vol.) of 35% hydrochloric acid, 89 parts (vol.) of 85% phosphoric acid and 43 parts (vol.) of 60% hydrofluoric acid. After thorough rinsing with water, the steel was rapidly dried.

A thin coating of the adhesive slurry was applied to the bonding surfaces and air dried for several minutes. This was repeated a second time. A proper size piece of heat cleaned glass fabric (112 weave) was placed on one surface. Two additional coats of adhesive slurry were applied to the glass fabric, allowing some air drying time between each coating. The coated adherants were heated for about 45 minutes at 80° C.–90° C. at 30 inches mercury pressure. The bonds were assembled in a 0.5 inch overlap curing fixture and inserted into a press preheated to 325° C. and left for an hour at 200 p.s.i. After cooling to room temperature, the bonds were postcured at 400° C. for six hours under vacuum.

When tested at room temperature, the average tensile shear strength was 4,320 p.s.i. with two of the four test specimens suffering tearing of the steel around the pinhole grip while the bond was unbroken. After an hour at 700° F. and testing at 700° F. an average tensile shear strength of 2,320 p.s.i. was obtained, again with two of four test specimens having the steel tear about the pin-hole grip. These test data are indicative of the superiority of this polybenzimidazole adhesive over presently known adhesives. It is also noteworthy that a high temperature stable adhesive can display such a high room temperature value.

The use of this adhesive was also evaluated on aluminum coupons. Since aluminum cannot be tested at 700° F., the heat stability of the adhesive was demonstrated by heat aging at 700° F. and testing at room temperature. It was found that after ten hours at 700° F. that the polybenzimidazole adhesive retained 83% of its initial room temperature strength.

From the foregoing, it will be apparent to those skilled in the art that the present invention provides a material not previously known, viz., fusible and adhesive polybenzimidazoles. The degree of completion to which the reaction employed to produce the fusible polymer of the present invention is carried out will depend upon the use to which this polymer is to be put. In addition, the degree of completion will also depend upon the technique which is to be used to prepare impregnated articles to be used in lamination or other processes. For example, the polymer prepared with diphenyl isophthalate has a lower fusion temperature than a polymer prepared from diphenyl terephthalate while a polymer prepared from diphenyl diphenate has an even lower fusion temperature. Since it is desired that the polymer be fusible at a temperature which will permit use in standard equipment, it is obvious that for a given use, different polymers within the scope of the present invention will generally be polymerized to different degrees of completion.

Another important factor in determining the degree of completion is the desired solubility of the polymer. In general, it is desirable to obtain the highest degree of completion while maintaining a useful solubility, preferably in the lowest boiling solvent. A useful solubility is that which permits dissolution of sufficient polymer such that a minimum number of dipping operations will result in sufficient polymer being combined with the substrate. It is preferred that only a single dipping operation be required. In general, a useful polymer content in the solution is between about 30% and about 70% by weight.

The two most widely used methods to impregnate glass cloth or fabric with resin are (1) dipping in a polymer solution and (2) hot melt impregnation. It has been found that the preferred degree of polymerization of the fusible polymer of the present invention will vary depending upon which impregnation method is employed.

For solution impregnation, the preferred degree of completion has been found to fall within the range of about 40%–85% of the theoretical amount of phenol and water to be liberated. This is calculated on the basis of two moles each of phenol and water per mole of diphenyl ester and aromatic tetramine. It has been found that this range corresponds to an inherent viscosity range of about 0.03 to about 0.10 determined as a 0.5% solution in dimethyl sulfoxide at 30° C. A still more preferred range of degree of completion of polymerization is about 60%–78%, corresponding to an inherent viscosity of about 0.05 to about 0.08. In general, a polymer having an inherent viscosity of greater than 0.10 is not suitable because of the high fusion temperature thereof, usually in excess of 400° C., which is somewhat above the temperature limitations of standard production presses.

For hot melt impregnation operations, the preferred range of degree of completion of polymerization is from about 15%–65% corresponding to an inherent viscosity of 0.03 to about 0.07. A still more preferred range of degree of completion is about 20%–50%, corresponding to an inherent viscosity of about 0.04 to about 0.06.

However, it is to be understood and emphasized that the above parameters are based on practical considerations. Therefore, it is entirely possible that polybenzimidazoles within the scope of the present invention may have properties other than those described above. This is particularly so when the use for which the fusible polymer of the present invention is to be employed involves the use of highly specialized processing equipment.

A wide range of solvents may be used in the practice of the present invention to accomplish solution impregnation. In general, any polar solvent such as dimethyl sulfoxide, pyrollidone, N-methylpyrollidone, N,N'-dimethylacetamide, hexamethyl-phosphoramide or pyridine may be used. It is desirable to use a solvent having the lowest possible boiling point in order to facilitate subsequent removal of the solvent from the impregnated product. For this reason, pyridine is a preferred solvent for use in the present invention. However, it has been found that, in general, the use of a solvent with a higher boiling point will be necessary for fusible polymers of the present invention having higher degrees of polymerization. In general, the preferred solids content of the impregnation solution is at least 20%.

Thus, the present invention makes possible the production of a supported polybenzimidazole, i.e., a structure comprising the polymer and a substrate which is firmly bonded to the polymer. Previous work with polybenzimidazoles has indicated that it would not be possible to produce such a structure because of the lack of adhesive properties and the lack of fusibility of these prior art polymers. One of the truly significant contributions of the present invention is the provision of polybenzimidazoles which may be used in a wide variety of laminating and bond fabricating processes. Several specific laminating processes using the polymer of the present invention are described in the foregoing examples. However, the laminating and uniting process of the present invention is not to be considered to be limited to these specific examples. Rather, the present invention includes within its scope the use of substantially fusible polybenzimidazoles as a uniting or bonding material in which the fusible polymer is first applied to one or more members which are to be laminated or otherwise united, the assembly of the members which are to be united and the curing of the polymer, usually under conditions of heat and pressure, to create a bond of unusual strength and unusual resistance to high temperatures. Representative strength properties which may be obtained by the practice of the present invention are set forth in Example 8. The contrast between these properties and the best currently available high temperature laminating resin are indeed remarkable. Silicone-phenolic resin is generally considered to be the best high temperature laminating material available. The flexural strength (p.s.i.) of this material at room temperature is 73,980 and at 700° F. for one hour is 34,030. The modulus (p.s.i. $\times 10^{-6}$) of this material at room temperature is 3.62 and at 700° F. for one hour is 2.41. The vast superiority of the product of the present invention is believed to be obvious from these data.

Having fully described the present invention, it is to be understood that it is not to be limited to the details set forth, but is of the full scope of the appended claims.

I claim:

1. A process comprising heat polymerizing a diphenyl ester of an aromatic dicarboxylic acid and an aromatic bis-o-diamine at an elevated temperature below that at which substantial infusibility occurs, continuing said polymerization until a fusible polybenzimidazole polymer havng an inherent viscosity in the range of from about 0.03 to about 0.10 as measured in a 0.5% solution of dimethyl sulfoxide, and a fusion temperature of less than about 400° C. is produced, said polymer being capable of becoming infusible upon further heating, and recovering said polybenzimidazole polymer.

2. A process comprising heat polymerizing a diphenyl ester of an aromatic dicarboxylic acid and an aromatic bis-o-diamine at an elevated temperature below that at which substantial infusibility occurs, continuing said polymerization until a polybenzimidazole having an inherent viscosity in the range of from about 0.03 to about 0.07 as measured in a 0.5% solution of dimethyl sulfoxide, and a fusion temperature of less than about 400° C. is produced, said polymer being capable of becoming infusible upon further heating, and recovering said polybenzimidazole polymer.

3. The process of claim 2 wherein said inherent viscosity is in the range of from about 0.05 to about 0.08.

4. The process of claim 2 wherein said inherent viscosity is in the range of from about 0.04 to about 0.06.

5. A process comprising heat polymerizing a diphenyl ester of an aromatic dicarboxylic acid and an aromatic bis-o-diamine at a temperature in excess of about 200° C. but below that at which substantial infusibility occurs, continuing said polymerization until a polybenzimidazole polymer having an inherent viscosity in the range of from about 0.03 to about 0.10 as measured in a 0.5% solution of dimethyl sulfoxide, and a fusion temperature of less than about 400° C. is produced, said polymer being capable of becoming infusible upon further heating, and recovering said polybenzimidazole polymer.

6. A process comprising heat polymerizing a diphenyl ester of an aromatic dicarboxylic acid and 3,3'-diaminobenzidine at an elevated temperature in excess of 200° C. but below that at which substantial infusibility occurs, continuing said polymerization until a polybenzimidazole having an inherent viscosity in the range of from about 0.03 to about 0.10 as measured in a 0.5% solution of dimethyl sulfoxide, and a fusion temperature of less than about 400° C. is produced, said polymer being capable of becoming infusible upon further heating, and recovering said polybenzimidazole polymer.

7. The process of claim 1 wherein said ester is diphenyl isophthalate.

8. The process of claim 1 wherein said ester is diphenyl terephthalate.

9. A novel fusible polybenzimidazole which is a high molecular weight condensation polymer of an aromatic bis-o-diamine and a phenyl ester of an aromatic dicarboxylic acid prepared at elevated temperatures below that at which substantial infusibility occurs, said polymer having an inherent viscosity in the range of from about 0.03 to about 0.10 as measured in a 0.5% solution of dimethyl sulfoxide and a fusion temperature of less than about 400° C., said polymer being capable of becoming infusible upon further heating.

10. The product of claim 9 wherein the aromatic bis-o-diamine is 3,3'-diamino-benzidine and said ester is diphenyl isophthalate.

11. The product of claim 9 wherein said aromatic bis-o-diamine is 3,3'-diamino-benzidine and said ester is diphenyl terephthalate.

References Cited

UNITED STATES PATENTS 3,174,947  3/1965  Marvel et al. _____ 260—47

MURRAY TILLMAN, *Primary Examiner.*

GEORGE F. LESMES, *Examiner.*

JOHN C. BLEUTGE, *Assistant Examiner.*